United States Patent [19]

Shiets

[11] Patent Number: 4,969,246

[45] Date of Patent: Nov. 13, 1990

[54] METHOD OF BORING ARTICLES

[75] Inventor: Leo C. Shiets, Fremont, Ohio

[73] Assignee: Axle Surgeons, Inc., Fremont, Ohio

[21] Appl. No.: 281,632

[22] Filed: Dec. 9, 1988

Related U.S. Application Data

[62] Division of Ser. No. 46,519, May 6, 1987, Pat. No. 4,820,089.

[51] Int. Cl.$^5$ ...................... B22D 19/10; B60D 35/00
[52] U.S. Cl. ............... 29/402.06; 29/402.09; 29/402.11
[58] Field of Search ................... 29/26 R, 26 A, 26 B, 29/401.01, 401.06, 402.19, 402.09, 402.16, 402.11; 408/105, 106, 111, 712

[56] References Cited

U.S. PATENT DOCUMENTS

| | | | |
|---|---|---|---|
| 1,734,787 | 11/1929 | Appleton | 29/26 B |
| 2,549,381 | 4/1951 | Matica | 408/106 |
| 4,098,029 | 7/1978 | Shiets | 29/402.19 X |
| 4,455,732 | 6/1984 | Shiets | 29/402.06 |
| 4,486,938 | 12/1984 | Hext | 29/402.06 |

Primary Examiner—Timothy V. Eley
Attorney, Agent, or Firm—Willian Brinks Olds Hofer Gilson & Lione

[57] ABSTRACT

An apparatus and method is directed to onsite repair of vehicle front axle steering components. The apparatus includes a pair of generally mirror-image members coupled by linear bearings and locking devices assembly provides rotary power to a boring bar which extends between the members and through the eye of the axle and a second drive assembly advances the boring bar axially along the eye. The mirror-image members accept pairs of an assortment of collars which adapt the apparatus to various sizes of eye diameters and corresponding boring bar sizes. The method includes the steps of selecting appropriate pairs of collars and a boring bar, positioning the members on the axle, tightening the apparatus to the axle and making appropriate cutting passes, typically a rough and finish cut, through the eye of the axle.

18 Claims, 3 Drawing Sheets

METHOD OF BORING ARTICLES

This is a divisional application of Ser. No. 07/046,519 filed 05/06/87, now U.S. Pat. No. 4,820,089.

BACKGROUND OF THE INVENTION

The invention relates generally to a method and apparatus for repairing cylinders and more specifically to a method and apparatus for onsite repair of motor vehicle front axle steering components, namely the king pin receiving eye.

Not only large tractor-trailers, utilized for cross country transport of goods, but smaller motor vehicles, utilized for local distribution and delivery of goods, may readily accumulate one hundred thousand or one hundred fifty thousand miles of service per year. Such use is the obvious result of simple economic analysis which makes it apparent that such a vehicle is not earning money when it is stationary.

It is also not earning money when it is out of service for repairs of either a preventative or necessary nature. Whereas preventative maintenance in may situations is valuable and the key to minimizing relatively predictable breakdowns and problems, it is too costly to anticipate and replace every component which may possibly fail after a period of operation which may very widely depending upon service related parameters. In short, although some vehicle components can be checked and repaired or replaced on a regular preventative maintentance schedule, there are many components which it is uneconomical to include in preventative maintenance programs. They will simply fail, more or less unpredictably, in service.

One of the major reasons for dismissing preventive maintentance in many situations is the expense attendant tearing down a component, inspecting various elements therein and reassembling the component. Such activities can infrequently be economically justified.

The result of the foregoing is that certain vehicle components will fail unexpectedly and at inconvenient times, i.e., at great distances from service facilities and terminals. It is therefore important to provide apparatus and techniques whereby commonly encountered unpredictable failures of motor vehicle equipment maybe repaired at the failure site as a means of not only minimizing the repair expense but also the period of time during which the vehicle remains out of service.

I have developed several machines and methods for repairing the undercarriage and suspension component of motor vehicles, especially tractor trailer rigs at the failure site and without removing the damaged component from the vehicle. For example, my U.S. Pat. No. 4,098,029 granted Jul. 4, 1978 teaches a method and apparatus for rebuilding and resurfacing the bearing surfaces of vehicle axles.

My U.S. Pat. No. 4,455,732 issued Jun. 26, 1984 is directed to a method for rebuilding vehicle drive axles by removing a portion of the axle, boring a concentric reentrant opening in the end of the axle and inserting and securing a stub axle thereinto. My U.S. Pat. No. 4,571,795 granted Feb. 25, 1986 is directed to the boring apparatus utilized in the above described method.

A review of these and other patents directed to various boring apparatus and onsite vehicle repair techniques reveals that further improvements in such devices are possible.

One area in which this is especially true relates to the front axle steering components of a truck. Typically the front axle is a transverse, horizontally extending beam or bar having a vertically oriented cylinder or eye disposed at each end which receives a stationary knuckle pin or king pin. The king pin extends above and below the axle and pivotally supports a steering knuckle upon which a front tire is rotatably supported and to which the tie rods are secured. The king pin eye is subject to slow but constant wear and must therefore eventually be bored and resleeved.

SUMMARY OF THE INVENTION

The present invention relates to an apparatuus and method for onsite repair of motor vehicle, especially truck and tractor front axle steering eyes. The apparatus includes a pair of generally mirror-image members coupled by linear bearings and locking devices which secure the mirror-image members to the upper and lower surfaces of a steering axle adjacent the eye. A first drive assembly provides rotary power to a boring bar which extends through the eye and between the members and is supported for rotation thereby. A second drive assemmbly rotates a pair of threaded lead screws which advance the boring bar axially through the eye. A pair of quick connect and disconnect assemblies receive and release the threaded lead screws prior to commencement of and at the completion of the boring operation. The mirror-image members accept pairs of an assortment of collars which adapt the apparatus to various sizes of eye diameters as well as receive various corresponding sizes of boring bars.

The method includes the steps of selecting appropriate pairs of collars and a suitably sized boring bar, positioning the mirror-image members on the upper and lower faces of the eye, centering and tightening the apparatus to the axle and making appropriate cutting passes, typically a first rough cut and a second finish cut through the cylindrical eye.

It will therefore be appreciated that an object of the present invention is to provide an apparatus for restoring damaged cylindrical surfaces.

It is a further object of the present invention to provide an apparatus for the onsite repair of cylindrical surfaces in motor vehicle steering axles.

It is a still further object of the present invention to provide a method for the repair of steering axle components.

It is a still further object of the present invention to provide a method for the onsite repair of cylindrical surfaces in motor vehicle steering axles.

Further objects and advantages of the present invention will become apparent by reference to the appended drawings and following description.

DESCRIPTION OF THE PREFERRED EMBODIMENT

Figure 1:
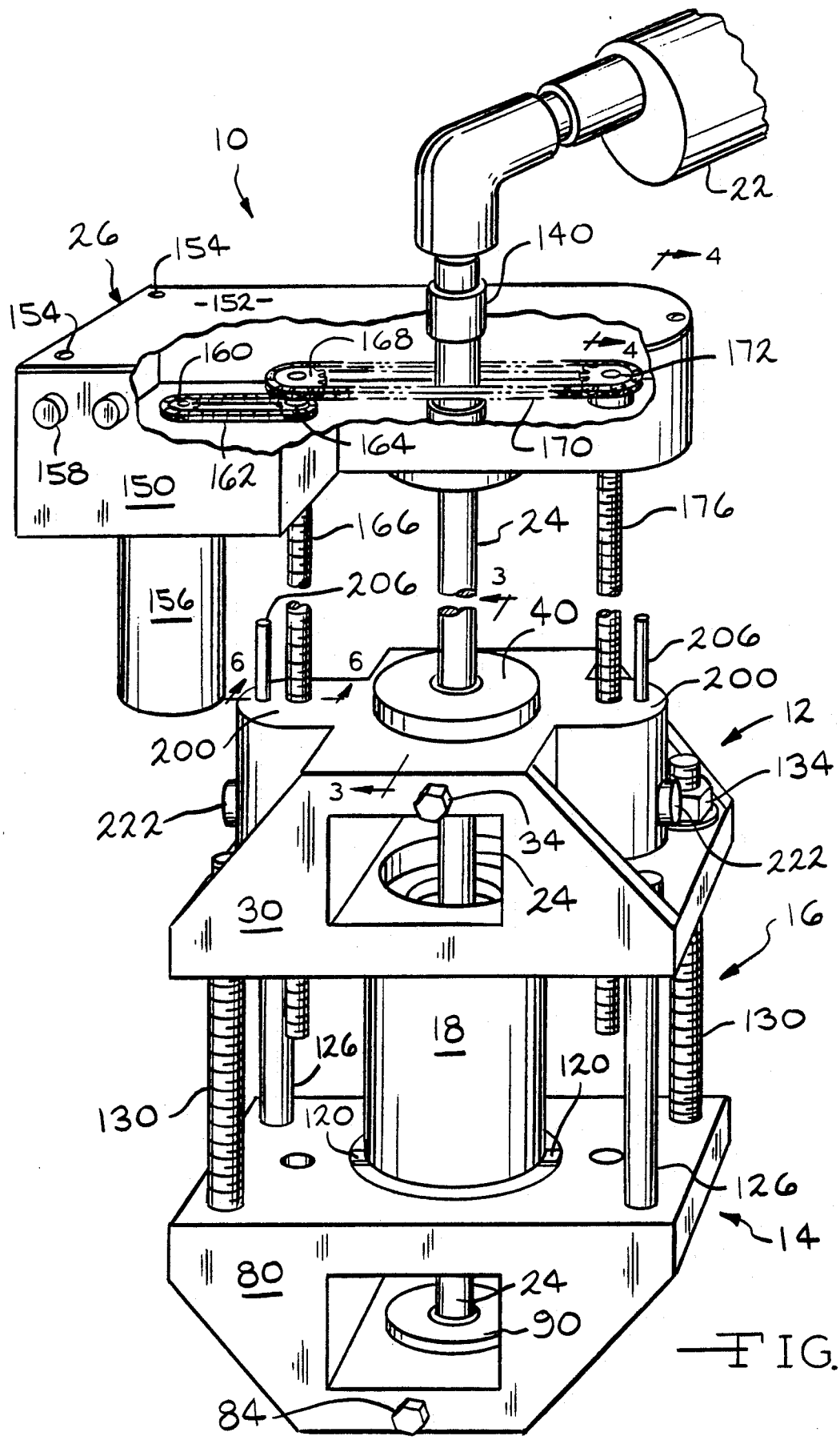
FIG. 1 is a perspective view with portions broken away of a steering axle repair apparatus.

Referring now to FIG. 1, an apparatus for repairing cylindrical surfaces in front axle steering eyes is illustrated and generally designated by the reference numeral 10. The apparatus 10 includes a first, upper clamp assembly 12 and a second, lower clamp assembly 14. The upper and lower assemblies 12 and 14 are coupled by a linear bearing and retention assembly 16 which both provides and permits bi-directional and uniaxial motion of the clamp assemblies 12 and 14 toward and away from one another and retains the assemblies 12 and 14 in intimate contact with the ends of a vehicle front axle 18 in the manner of a vise. The apparatus 10 includes a first drive assembly 22 which provides rotational energy to a boring bar 24. The apparatus 10 also includes a second drive assembly 26 which axially advances the boring bar 24 through the axle 18 as will be more fully described subsequently.

Figure 2:
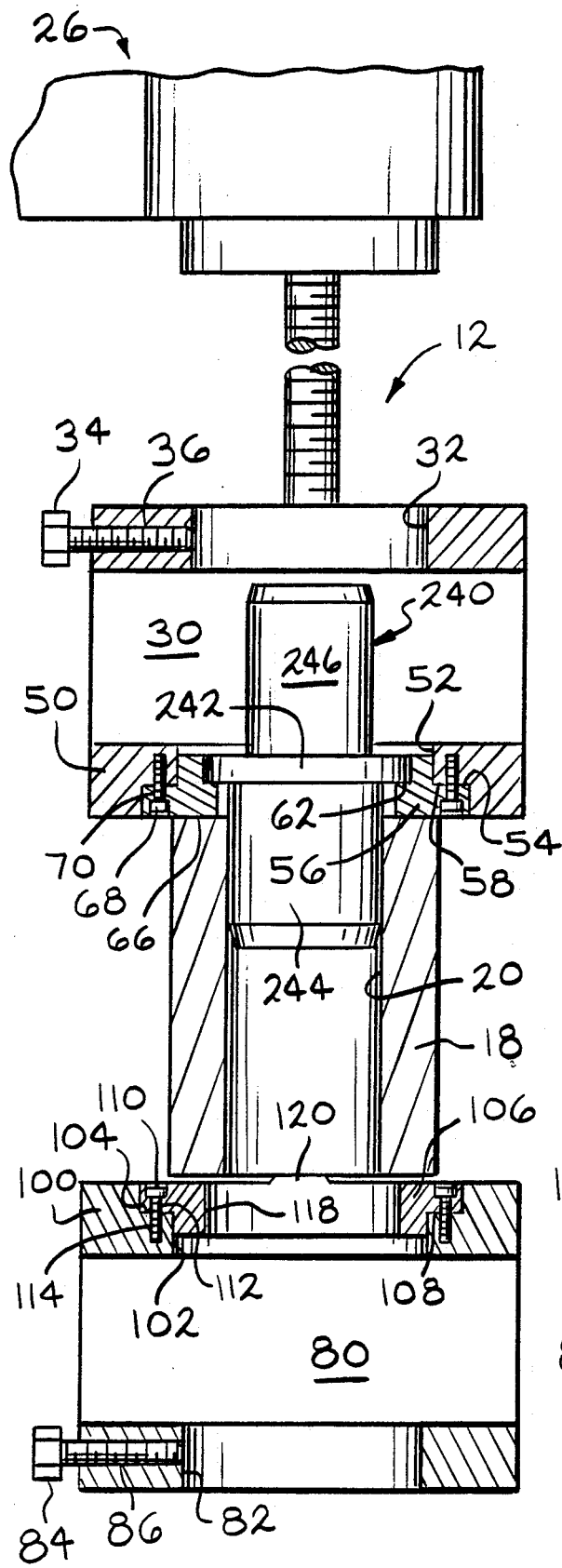
FIG. 2 is a fragmentary, full sectional view of a steering axle repair apparatus according to the present invention.
Figure 3:
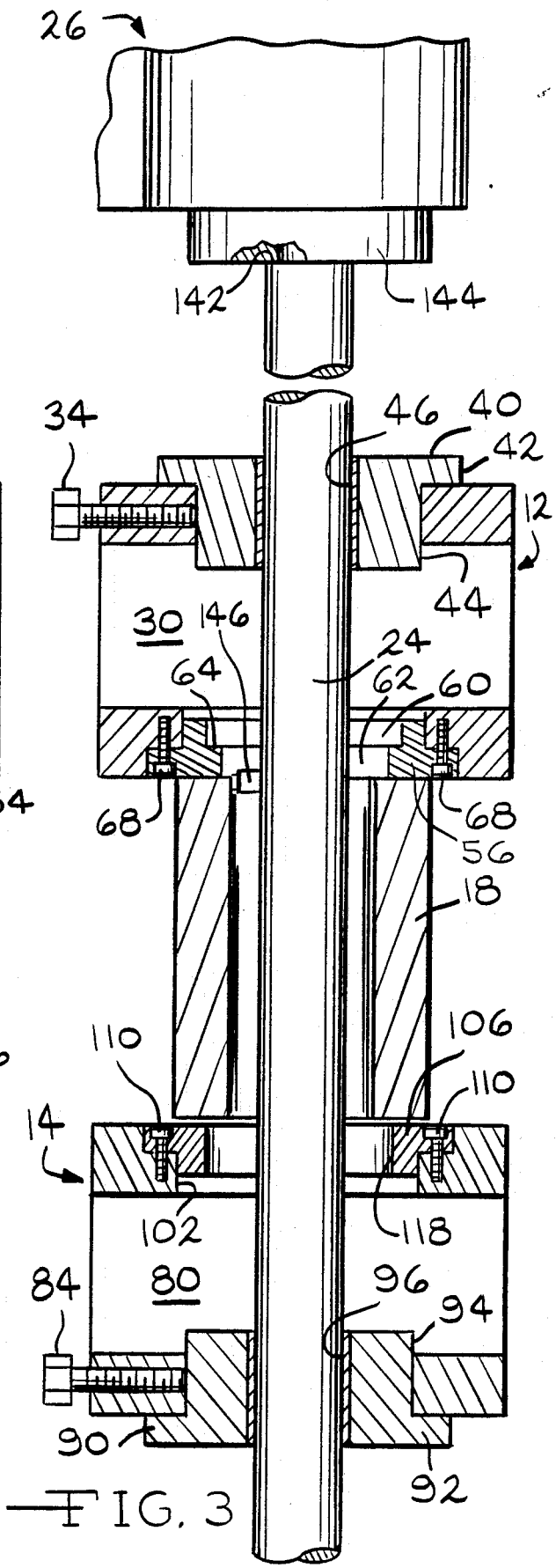
FIG. 3 is a full, sectional view of a steering axle repair apparatus according to the present invention taken along line 3—3 of FIG. 1.

Referring now to FIGS. 1, 2 and 3, the first, upper clamp assembly 12 defines a generally trapezoidal first clamp body 30 which may be unitarily cast of any suitable material such as iron, steel or aluminum or may be fabricated of plates and panels secured together by suitable means such as welding. The first clamp body 30 defines a first aperture 32 having a uniform diamter. A threaded set screw 34 is received within a complementarily threaded radially oriented passageway 36 disposed preferably at the axial midpoint of the first aperture 32. The first aperture 32 receives and the set screw 34 tightly secures one of a set of assorted collars 40 having an enlarged diameter lip region 42 and a smaller diameter shank region 44. The shank region 44 is slightly smaller in diameter than the diameter of the first aperture 32 which receives the shank region 44 of the collar 40 therein. The lip region 42 rests against the upper surface of the clamp body 30 and the set screw 34 may be utilized to tightly secure or release the collar 40 within the first aperture 32 as will be readily appreciated. Concentrically disposed within the collar 40 illsutrated as well as other collars in the assortment of collars is a through circular passageway 46 having a diameter complementary to the diameter of the boring bar 24. It will be understood that various collars 40 may be utilized having various diameters of passageways 46 to complement various diameters of boring bars 24.

The first clamp body 30 includes a lower plate 50 which defines a second aperture 52 axially aligned with the first aperture 32. The second aperture 52 has a first, smaller diameter region which is preferably equal to the diameter of the first aperture 32 and a second, larger diameter region which are both axially adjacent a radially extending shoulder 54.

A second collar 56 having larger and smaller diameter regions both slightly smaller than and complementary to corresponding regions of the second aperture 52 includes a shoulder 58 which is complementary to the shoulder 54 within the second aperture 52. The second collar 56 also defines a concentrically disposed larger diameter aperture 60 and a smaller diameter aperture 62 both axially adjacent a radially extending shoulder 64. It will be understood that the present invention comprehends an assortment of second collars 56 having various and distinct aperture diameters which may be utilized in conjunction with a variety of steering axles 18 having eyes 20 of distinct diameters. Preferably, the diameter of the smaller aperture 62 is at least slightly larger than the diameter of the eye 20 in the axle 18. The second collar 56 preferably also defines a flat radially extending surface 66 against which the upper end of the axle 18 may be juxtaposed. The second collar 56 is retained within the clamp body 30 by a suitable set of threaded fasteners 68 which pass through axially extending apertures 70 in the edge adjacent region of the second collar 56 and into blind, complementarily threaded openings 72 in the body 30 of the first, upper clamp assembly 12.

As noted, the second, lower clamp assembly 14 is generally a mirror image of the first, upper clamp assembly 12. As such, it includes a second, generally trapezoidal clamp body 80 which may be unitarily cast or assembled from panels and plates of metal by welding or other suitable means. It likewise includes a first aperture 82 and a threaded set screw 84 received within a complementarily threaded aperture 86 radially aligned with the axial midpoint of the aperture 82. The diameter of the first aperture 82 of the second body 80 is preferably identical to the diameter of the first aperture 32 of the first body 30. A third collar 90 having a lip region 92 and reduced diameter shank region 94 is received within the first aperture 82 and selectively retained or released by the threaded set screw 84. The third collar 90 defines a concentrically disposed circular aperture 96 having a diameter which is complementary to the diameter of the boring bar 24. It will be appreciated that an assortment of the third collars 90 defining various sizes of internal apertures 96 which receive various sizes of boring bars 24 are comprehended by the present invention. It should be appreciated that the first and third collars 40 and 90, respectively, may be identical and will be so provided and utilized since variations therein relate only to variations in the diameters of the passageways 46 and 96, not to the sizes of the apertures 32 and 82. Thus, the boring bar 24 is supported at the upper and lower regions of the upper and lower clamp assemblies 12 and 14, respectively, by the first and third collars 40 and 90, respectively.

The second clamp body 80 of the second, lower clamp assembly 14 includes an upper plate 100 which is preferably disposed parallel to the lower plate 50 of the first, upper clamp assembly 12. The upper plate 100 defines a stepped aperture 102 having a first, larger diameter region and a second, smaller diameter region both adjacent a radially outwardly extending sholder region 104. The stepped aperture 102 receives a complementarily stepped fourth collar 106 having a larger region which is slightly smaller than the larger diameter region of the stepped aperture 102 and a smaller diameter region which is slightly smaller than the diameter of the smaller diameter region of the stepped aperture 102 which is disposed adjacent a radially extending shoulder region 108 which is complentary to the shoulder region 104 of the stepped aperture. The fourth collar 106 is maintained within the stepped aperture 102 with the shoulder regions 104 and 108 in juxtaposition by a plurality of threaded fasteners 110 which pass through axially extending apertures 112 in the edge adjacent region of the foruth collar 106 and into blind, complementarily threaded openings 114 in the upper plate 100. The fourth collar 106 also defines a through, concentrically disposed aperture 118 which has a diameter at least slightly larger than the diameter of the eye 20 in the axle 18. It will be appreciated that the present invention comprehends an assortment of the fourth collars 106 having various diameters of the aperture 118. The fourth collar 106 also includes a pair of diametrically disposed raised axle engaging flats 120 which engage the lower surface of the axle 18 and ensure that damaged and oblique lower surfaces of the axle 18 do not interfere with its proper orientation perpendicular to the surface 66 of the second collar 56.

Figure 5:
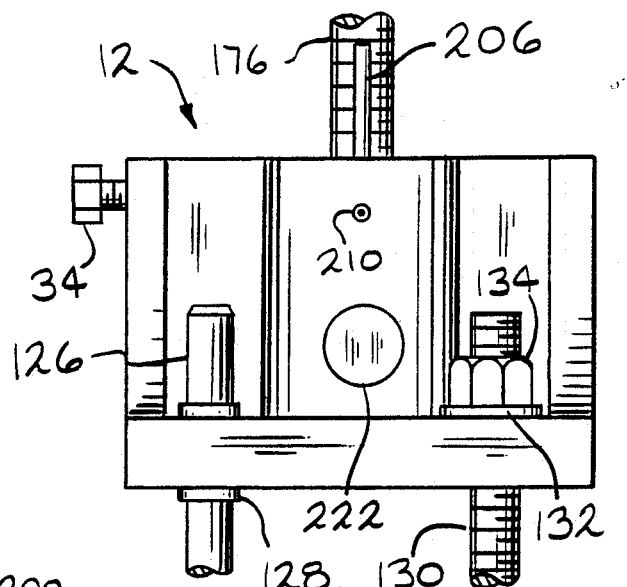
FIG. 5 is a fragmentary, side elevational view of the first, upper clamp assemmbly of the steering axle repair apparatus according to the present invention.
Figure 6:
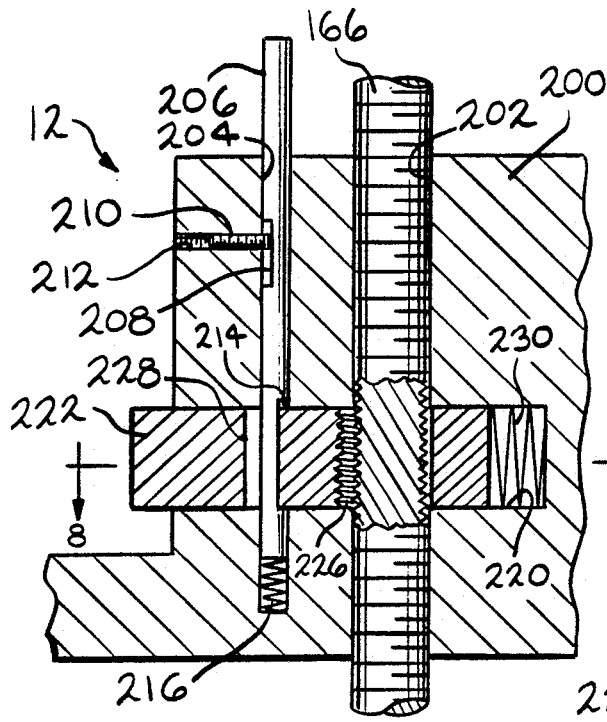
FIG. 6 is a fragmentary, full sectional view of a portion of a quick disconnect mechanism of the steering axle repair apparatus according to the present invention taken along 6—6 of FIG. 1.

Referring now to FIGS. 1 and 5, the first, upper clamp assembly 12 and second, lower clamp assembly 14 are coupled by a linear bearing and retention assembly 16 as previously noted. The assembly 16 includes a pair of parallel, preferably equal length rods 126. The rods are secured to the upper plate 100 of the second clamp body 80 of the second, lower clamp assembly 14 adjacent diagonal corners by any suitable means such as complementary threads or weldments (not illustrated). The opposite ends of the rods 126 are slidingly received within complementarily sized bushings 128 disposed in the lower plate 50 of the first clamp body 30 of the first, upper clamp assembly 12. The rods 126 and the bushings 128 function as linear bearngs which limit relative motion between the clamp assemblies 12 and 14 to bi-directional motion along to the axes defined by the rods 126. Disposed parallel to the rods 126 and secured to the upper plate 100 in a diagonal relationship in the remaining corners of the upper plate 100 are a pair of threaded rods 130. The threaded rods 130 may be received within complementarily threaded apertures in the upper plate 100 and preferably further secured by weldments or other means which positively inhibit rotation of the threaded rods 130. The threaded rods 130 extend through aligned openings in the lower plate 50. On the portion of each of the threaded rods 130 that extends above the lower plate 50 is disposed a washer 132 and a nut 134. The threaded rods 130 and cooperating nuts 134 provide a mechanism whereby the clamp asemblies 12 and 14 and specifically the surface 66 of the second collar 56 and the flats 120 of the fourth collar 106 may be tightened like a vise about the axle 18 to securely maintain it therebetween. Conversely, the nuts 134 may be fully removed from the threaded rods 130 and the first, upper clamp assembly 12 fully separated from the second, lower clamp assembly 14, if desired.

The first drive assembly 22 is also illustrated in FIG. 1. The first drive assembly 22 is preferably a conventional right angle drive power drill such as the Model 90 Milwaukee one-half inch electric drill. Power is supplied to the boring bar 24 through an appropriate coupling 140 which permits disassembly of the drive assembly 22 from the boring bar 24 if desired.

Referring to FIG. 3, it will be appreciated that the boring bar 24 defines a shoulder 142 adjacent its upper end which seats against a thrust bearing 144 which is secured to the second drive assembly 26. The boring bar 24 also includes a conventional boring bar cutter 146 disposed at approximately the mid point of its length.

Figure 4:
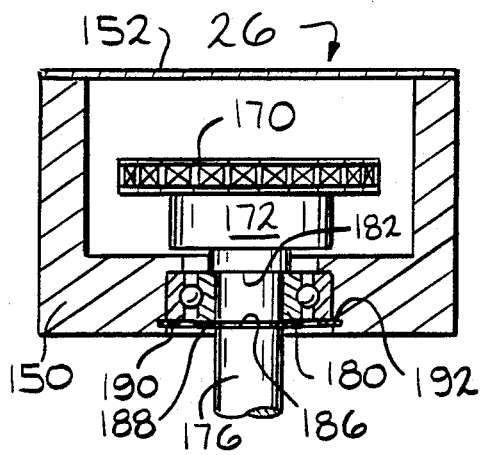
FIG. 4 is a full, sectional view of the second drive assembly of a steering axle repair apparatus according to the present invention taken along 4—4 of Figure.

Referring now to FIGS. 1 and 4, the second drive assembly 26 includes a generally elongate housing 150 having a cover plate 152 secured by suitable fasteners 154. The second drive assembly 26 includes variable speed motor 156. The rotational output speed of the motor 156 may be adjusted by a potentiometer 158 or similar device incorporated into an SCR or triac control device supplying power to the drive motor 156. Secured to the output shaft of the drive motor 156 is a pinion 160. Received on the pinion 160 is a drive chain 162 which transfers rotational energy to a second pinion 164. The second pinion 164 is secured to an end adjacent region of a first threaded lead screw 166. A third pinion 168 is likewise secured to the end of the lead screw 166 adjacent the second pinion 164 and receives a second drive chain 170. The second drive chain 170 is likewise received upon and transfers rotational energy to a fourth pinion 172. The fourth pinion 172 is likewise secured to an end adjacent region of a second threaded lead screw 176. The third and fourth pinions 168 and 172 are of equal diameter. Thus, the first and second lead screws 166 and 176, respectively, rotate at the same speed, such speed being adjustable and determined by the setting of the potentiometer 158. The lead screws 166 and 176 extend through the housing 150 and are journalled within suitable ball bearing assemblies 180 (one of which is illuatrated in FIG. 4). The ball bearing assemblies 180 are preferably capable of transferring both axial and radial forces to the housing 150. The lead screws 166 and 176 define a shoulder 182 which inhibits relative motion between the lead screws 166 and 176 and the ball bearing assembly 180 in one direction. The lead screws 166 and 176 likewise define a circumferential groove 186 which receives a first snap ring 188. The lead screws 166 and 176 are thus constrained against axial motion relative to the housing 150. The ball bearing assemblies 180 are likewise retained within the housing 150 by a snap ring 190 received within a complementarily sized circumferential groove 192 formed in the housing 150.

Referring now to FIGS. 1, 6, 7 and 8, a mechanism for connecting and disconnecting the lead screws 166 and 176 from the first, upper clamp assembly 12 is illustrated. The pair of lead screws 166 and 176 are received within a respective pair of mirror-image lugs or webs 200 formed in the body 30 of the first, upper clamp assembly 12. It will be appreciated that two of the quick mechanisms are utilized and that the following description directed to the first threaded lead screw 166 and associated components applies with equual accuracy and force to the mechanism associated with the second threaded lead screw 176. The web 200 defines a first, larger smooth (i.e. unthreaded) walled passageway 202 which receives the first threaded lead screw 166 and a second parallel and adjacent smaller passageway 204 which receives an axially slidable disconnect control rod 206. The disconnect control rod 206 includes an axially extending channel 208 formed along a portion of its length which receives a threaded set screw 210 disposed within a complementarily threaded passageway 212 intersecting and radially extending from the passageway 204. The set screw 210 limits the axial travel of the disconnect control rod 206 to the length of the channel 208 minus the diameter of the set screw 212 as will be readily appreciated. The smaller passageway 204 is blind and, in a region between the end of the disconnect control rod 206 and the end of the passageway 204 is disposed a compression spring 214. The compression spring 214 biases the disconnect control rod 206 toward the position illustrated in FIG. 7. The disconnect control rod 206 further includes a second axially extending channel 214 disposed between the first axial channel 208 and the end of the disconnect control rod 206 disposed within the web 200.

Figure 7:
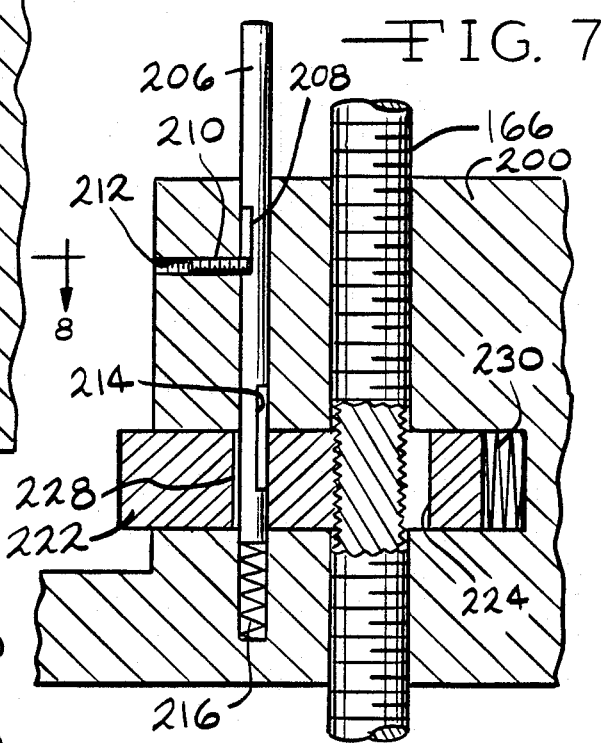
FIG. 7 is a fragmentary, full sectional view of a portion of the quick disconnect mechanism of the steering axle repair apparatus according to the present invention taken along 6—6 of FIG. 1.
Figure 8:
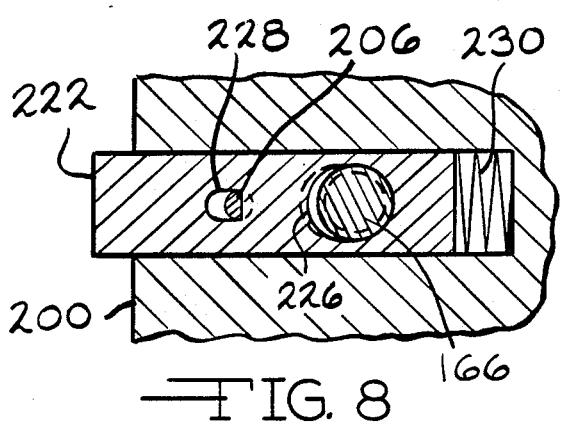
FIG. 8 is a fragmentary, sectional view of the quick disconnect mechanism according to the present invention taken along line 8—8 of FIG. 6.
Figure 9:
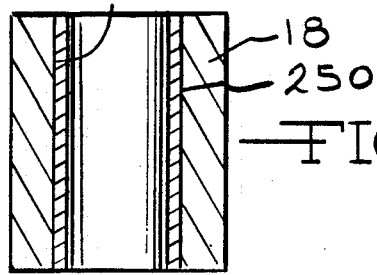
FIG. 9 is a full, sectional view of a steering axle eye and sleeve.

The web 200 also defines a blind passageway 220 oriented perpendicularly to the passageways 202 and 204 and which intersects both. The blind, perpendicular passageway 220 slidingly receives a connect or activate control rod 222. The activate control rod 222 defines a first radially extending through passageway 224 having threads 226 complementary to the threads on the first threaded lead screw 166 extending about only one-half of the diameter of the through passageway 224. The activate control rod 222 also defines a second radially extending through passageway 228 which is parallel to the first passageway 224. The second through passageway 228 receives the disconnect control rod 206 and is "D" shaped in cross section as illustrated in FIG. 7, thereby permitting limited axial motion of the activate control rod 222 notwithstanding the presence of the disconnect control rod 206 extending therethrough. Disposed between the terminal portion of the activate control rod 222 disposed within the web 200 and the end of the blind passageway 220 is a compression spring 230. The compression spring 230 biases the activate control rod 222 away from the blind end of the aperture 220 as will be readily appreciated.

Referring now to all of the drawing figures and especially FIGS. 1, 2, 3 and 9, the method of repairing a vehicle front axle 18 will now be described. At the outset, it should be understood that the various components of the vehicle steering system (not illustrated) must be removed from the front axle 18 in order to achieve the boring process of the present invention. Thus, it is necessary to remove the king pin (not illustrated) from the front axle 18 and to remove the steering knuckle (not illustrated) associated therewith. Next, appropriate pairs of collars 56 and 106 having inner diameters at least as large and preferably somewhat larger than the diameter to which the eye 20 of the front axle 18 will be enlarged are selected. The collars 56 and 106 are secured by the respective fasteners 68 and 110 into the respective lower plate 50 and upper plate 100. The axle 18 is then positioned between the surface 66 of the second collar 56 and the flats 120 of the fourth collar 106.

An alignment tool 240 is then placed in the second collar 56. The alignment tool 240 includes a centrally disposed annulus 242 having an outer diameter slightly less than the larger diameter region of the aperture 52. The annulus 242 is received upon the shoulder 62 of the collar 56 thereby centering the alignment tool 240 within the collar 56 and the body 30 of the first, upper clamp assembly 12. The alignment tool 240 also includes a pair of opposed cylinders 244 and 246 which are concentric with the annulus 242. The cylinders 244 and 246 are of distinct diameters which are slightly smaller than the internal diameters of the eye 20 of various and typical front axles 18. The alignment tool 240 and specifically one of the cylinders 244 or 246 thus aligns the axle 18 and specifically the axis of the eye 20 with the central axis of the assembly 10 and specifically the cutting axis of the boring bar 24. With the alignment tool 240 still in place as illustrated in FIG. 2, the bolts 134 on the threaded rods 130 are tightened, thereby clamping the front axle 18. The alignment tool 240 is then removed.

Next, an appropriate diameter boring bar 24 is selected as well as the first and third collars 40 and 90 having complementary diameter passageways 46 and 96, respectively, which receive the selected size of boring bar 24. The boring bar 24 is then inserted through the first, upper clamp assembly, through the eye 20 in the axis 18 and through the second, lower clamp assembly 14. The first collar 40 and the third collar 90 are then placed upon the boring bar and slid into the respective apertures 32 and 82 and tightly secured in the positions illustrated in FIG. 3 by the respective set screws 34 and 84.

Next, the first drive assembly 22 and the second drive assembly 26 are assembled to the interconnected and secured first and second clamp assemblies 12 and 14. The disconnect control rods 206 should then be checked to ensure that they are in their depressed position such that the first and second threaded lead screws 166 and 176 respectively may be easily moved into the passageways 202. The boring bar 24 is positioned into the thrust bearing 144 and coupled by means of the coupling 140 to the first drive assembly 22. The drive assemblies 22 and 26 are then slid toward the first, upper clamp assembly 12 until the boring bar cutter 146 is in the position illustrated in FIG. 3 or higher, that is, further away from the axle 18. At this time, the activate control rods 222 are depressed such that the first and second lead screws 166 and 176 are engaged by the threads 226 thereon. The cutter 146 is set to a desired radial position to provide the proper depth of cut and diameter of the eye 20.

Next, the first and second drive assemblies 22 and 26 are activated. The first drive assembly 22 is typically a constant speed device although it may be a variable speed device if desired. The second drive assembly 26 is a variable speed device which in effect adjusts the speed of axial travel, i.e., the feed rate, of the boring process. The potentiometer 158 may therefore be adjusted to provide the appropriate feed rate in accordance with conventional boring practice. Typically the first cut will be a rough cut and upon completion of the rough cut, the first and second drive asemblies 22 and 26 will be shut down, the disconnect control rods 206 will be activated and the drive assemblies 22 and 26 and the threaded lead screws 166 and 176 will be removed from the first and second clamp assemblies 12 and 14. The boring bar 24 may then be removed by loosening the set screws 34 and 84 and removing the respective collars 40 and 90. An initial measurement of the diameter of the eye 20 may then be taken and, if additional cuts or a finish cut are required or desired, the foregoing attachment and cutting steps may be repeated.

When the desired diameter of the eye 20 has been achieved, the nuts 134 may be loosened and the upper and lower clamp assemblies 12 and 14 may be removed from the axle 18. Finally, a sleeve 250 is fitted into the newly bored and enlarged eye 20 in the axle 18 and the steering knuckle and king pin as well as in the other associated steering components may be reassembled.

The foregoing disclosure is the best mode devised by the inventor for practicing this invention. It is apparent, however, that methods and apparatus incorporating modifications and variations will be obvious to one skilled in the art of steering component repair. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A method of repairing a vehicular steering component having a cylindrical bore defining an axis, comprising the steps of:

providing a pair of clamp members defining a cutting axis, positioning said pair of clamp members about such component with said bore axis and said cutting axis in alignment, securing said clamp members to said component, providing and rotatably supporting a boring bar having a cutter in said pair of clamp members in alignment with said bore axis, and rotating and axially translating said boring bar and cutter to bore said cylindrical bore.

2. The method of claim 1 further including the step of providing an alignment tool and utilizing said alignment tool to align said bore axis and said cutting axis.

3. The method of claim 1 further including the step of inserting an annular sleeve into said cylindrical bore.

4. The method of repairing articles of claim 1 further including the step of setting the radial position of a cutter on said boring bar to provide a desired depth of cut.

5. The method of claim 1 further including repeating at least the step of rotating and axially translating said boring bar to bore said cylindrical passageway on a second, final cut.

6. A method of repairing a vehicular steering component having a cylindrical passageway defining an axis comprising the steps of:

providing a pair of members defining a boring axis, clamping said component between said pair of members with said axis of said passageway and said boring axis in alignment, rotatably supporting a boring bar including a cutter in said pair of members coincident with said article and said boring axes, and rotating and axially translating said boring bar and said cutter in said cylindrical passageway to bore said passageway.

7. The method of claim 6 further including the step of selecting a pair of collars and securing said collars to a respective one of said pair of members.

8. The method of claim 6 further including the step of aligning the axis of said cylindrical passageway with the boring axis of said members by positioning an alignment tool through one of said members and into said passageway.

9. The method of claim 6 further including the step of setting the radial position of a cutter on said cutting bar to provide a desired depth of cut.

10. The method of claim 6 wherein the speed of rotation of said boring bar is substantially constant and the speed of axial translation of said boring bar is adjustable.

11. The method of claim 23 further including the step of inserting an annular sleeve into said cylindrical passageway.

12. A method of repairing a vehicular steering component having a cylindrical passageway defining an axis comprising the steps of:

providing a pair of clamp members defining a boring axis, confining said component between said pair of clamp members with said axis of said passageway and said boring axis in alignment, rotatably supporting a boring bar having a cutter in said pair of clamp members coincident with said article axis and said boring axis, rotating and axially translating said boring bar and said cutter in said cylindrical passageway to bore said passageway, and removing said pair of clamp members from said article.

13. The method of claim 12 further including the step of selecting a pair of collars and securing said collars to a respective one of said pair of clamp members.

14. The method of claim 12 further including the step of aligning the axis of said cylindrical passageway with the boring axis of said clamp members by positioning an alignment tool through one of said clamp members and into said passageway.

15. The method of claim 12 further including the step of setting the radial position of a cutter on said cutting bar to provide a desired depth of cut.

16. The method of claim 12 wherein the speed of rotation of said boring bar is substantially constant and the speed of axial translation of said boring bar is adjustable.

17. The method of claim 12 further inlcuding the step of inserting an annular sleeve into said cylindrical passageway.

18. The method of claim 12 further including the step of adjusting the axial speed of translation of said boring bar.

* * * * *